April 7, 1970     W. F. MacPHERSON     3,504,395

MANUFACTURE OF INSULATED WIRES

Original Filed Sept. 16, 1966     3 Sheets-Sheet 1

INVENTOR
W. F. MAC PHERSON
BY Leo Stanger
ATTORNEY

April 7, 1970 W. F. MacPHERSON 3,504,395
MANUFACTURE OF INSULATED WIRES
Original Filed Sept. 16, 1966 3 Sheets-Sheet 2

April 7, 1970     W. F. MacPHERSON     3,504,395
MANUFACTURE OF INSULATED WIRES
Original Filed Sept. 16, 1966     3 Sheets-Sheet 3

United States Patent Office 3,504,395
Patented Apr. 7, 1970

3,504,395
MANUFACTURE OF INSULATED WIRES
William F. MacPherson, South Plainfield, N.J., assignor to Bell Telephone Laboratories, Incorporated, Murray Hill, N.J., a corporation of New York
Original application Sept. 16, 1966, Ser. No. 580,095, now Patent No. 3,459,851. Divided and this application Feb. 25, 1969, Ser. No. 813,380
Int. Cl. B29f 3/10
U.S. Cl. 18—2                                          10 Claims

ABSTRACT OF THE DISCLOSURE

An apparatus controls extrusion of plastic insulation about two conductors simultaneously to form "an insulated pair." Means in the apparatus alternately compare an index capacitance to the respective capacitances between each conductor and an electrolytic liquid through which the insulated conductors are passed. Measuring means obtain the time-integrated differences between the alternate comparisons. Servo means change the relative rates of extrusion about each conductor on the basis of the time-integrated differences. Simultaneously, control means measure the average values of the alternate comparisons. Second servo means vary the total extrusion rate on the basis of these average values.

---

This is a division of parent application Ser. No. 580,095 filed Sept. 16, 1966, now Patent No. 3,459,851.

This invention relates to manufacture of insulated wires, particularly for inclusion in communication cables as one of many twisted wire pairs, each of which propagates many channels of voice frequencies or video signals over wide frequency ranges, such as 6 megacycles.

It is desirable to obtain the maximum signal propagation from communication cables themselves in order to reduce the number of electronic repeaters generally distributed at intervals along the cable path. For this purpose, it has been found advantageous to manufacture cable wires in the form of so-called dual pairs. A dual pair is composed of two separate wires in a single insulating jacket.

A particular type of dual pair is made by extruding, about the two wires, a common plastic insulating jacket which also separates the wires. Such a pair, called a plastic extruded pair, or "PEP" pair has a number of advantages. For example, because they are imbedded in the same plastic insulation, the wire lengths along any distance of the plastic extruded pair are always equal. Thus, when the pair is twisted for reducing crosstalk, i.e., that is reducing the signal interchange between adjacent pairs of a cable, it is possible to obtain the maximum twist uniformity and hence the maximum crosstalk reduction from this twisting expedient. Plastic insulated pairs also permit any desired separation of the wires independent of the total insulation thickness.

Plastic extruded pairs also can be capacitance-balanced more accurately than ordinary pairs. Capacitance-balanced means that the distributed capacitance between one wire of a twisted pair and the surrounding so-called "ground" formed by the other wires in the cable, equals the distributed capacitance between the other wire in the same twisted pair and the "ground." By virtue of such capacitance balance the leakage impedances from each wire to ground are equal. Thus, noise or crosstalk voltages from wire to ground, which usually start equal in both wires and propagate along the two wires in the same direction are attenuated equally in both wires. The resulting noise or voltages across the wires in each twisted pair are then equal at other locations and cancel each other. They are then ineffective for disturbing transmission.

A suitable method for manufacturing plastic insulated pairs with balanced capacitances appears in the application of A. S. Windeler, Case 6, Ser. No. 264,876, filed Mar. 13, 1963. This apparatus alternately compares a standard capacitor with the distributed capacitance that exists between a column of electroconductive liquid contacting the outer surface of a pair being extruded and one and then the other wire. The apparatus establishes the column of liquid by means corresponding to those in M. C. Biskeborn, Patent No. 2,804,592 of Aug. 27, 1957. It does this with a cylindrical electrically-charged measuring electrode submerged in the electroconductive liquid and with neighboring guard electrodes whose potential is neutral relative to the measuring electrode for the purpose of confining the measuring electrode's effect. After distinguishing between positive and negative departures, the apparatus measures the difference between successive departures and corrects the extruder output to minimize them. Such an apparatus is quite capable of achieving excellent capacitance balances. However, even these results are often inadequate. Moreover, while these apparatuses are capable of improving capacitance balance, and thereby reducing crosstalk enough to increase the allowable interval between consecutive repeaters in a cable, the cables ultimately become "attenuation limited" rather than "crosstalk limited." That is, despite comparative freedom from crosstalk the attenuation experienced by information signals in the cable may be great enough to require electronic repeaters at much shorter intervals. This is so because the intervals between repeaters must be small enough to accommodate the cable lengths having the highest attenuation which a signal is likely to encounter. By making the attenuation of all lengths uniform, repeater stations can be placed further apart than if the wire attenuation had wide swings. Ordinary pair manufacturing systems with or without capacitance-balancing apparatuses, no matter how accurate, fail to afford this uniformity.

Some uniformity is available by establishing uniform wire sizes and wire spacing. However, considerable variations in attenuations arise from changes in the consistency and dimensions of the extruded insulation. For single wires these variations can be reduced as proposed in the beforementioned Biskeborn patent. However, to apply these teachings to a double wire requires two separate sets of probe electrodes, one for each wire. Otherwise it may be necessary to connect the wires in parallel while capacitance measurements are made. The latter measurements however fail to consider the condition of the insulation between the wires in a pair. These conditions may greatly affect the attenuation. The measurements also require extra equipment for establishing the desired capacitance balance.

An object of this invention is to improve means for manufacturing dual pairs for electric cables, particularly by eliminating the above deficiencies.

Another object is to improve the uniformity of the attenuation along the lengths of dual pairs.

Another object is to improve means for manufacturing plastic extruded pairs having uniform distributed capacitances, particularly while maintaining the capacitive balance between the wires at the pair.

Still another object of the invention is to improve capacitance-balance apparatuses.

According to a feature of the invention these ends are achieved in whole or in part by alternately comparing an index capacitor with the capacitance from an electroconductive liquid contacting the surface of a dual pair being extruded to one and then the other wire of a pair, and then modifying the extruding process, such as by slowing it or speeding it up on the basis of the average departures from the index capacitance to obtain a minimum average.

Preferably this is done while at the same time modifying the extruding process to obtain capacitance balance on the basis of the total of the same sequential departures.

Another aspect of the invention involves eliminating the average departure from the total departures to obtain more efficient capacitance balance.

According to another feature of the invention the signals of alternate departures are filtered in a low pass filter to obtain information for affecting the extruding process.

The invention is based upon the recognition that the departures of the alternate comparisons indicate not only unbalance but that they include a very low frequency component or drift that corresponds to the departure from uniformity and that this departure if used alone can modify the extrusion process to correct uniformity errors. Moreover, the invention is based upon the recognition that the low frequency component disturbs the unbalance correction, and that by eliminating it, capacitance unbalance corrections to .01% can be achieved.

These and other features of the invention are pointed out in the claims. Other objects and advantages will become obvious from the following detailed description wherein:

Figure 1:
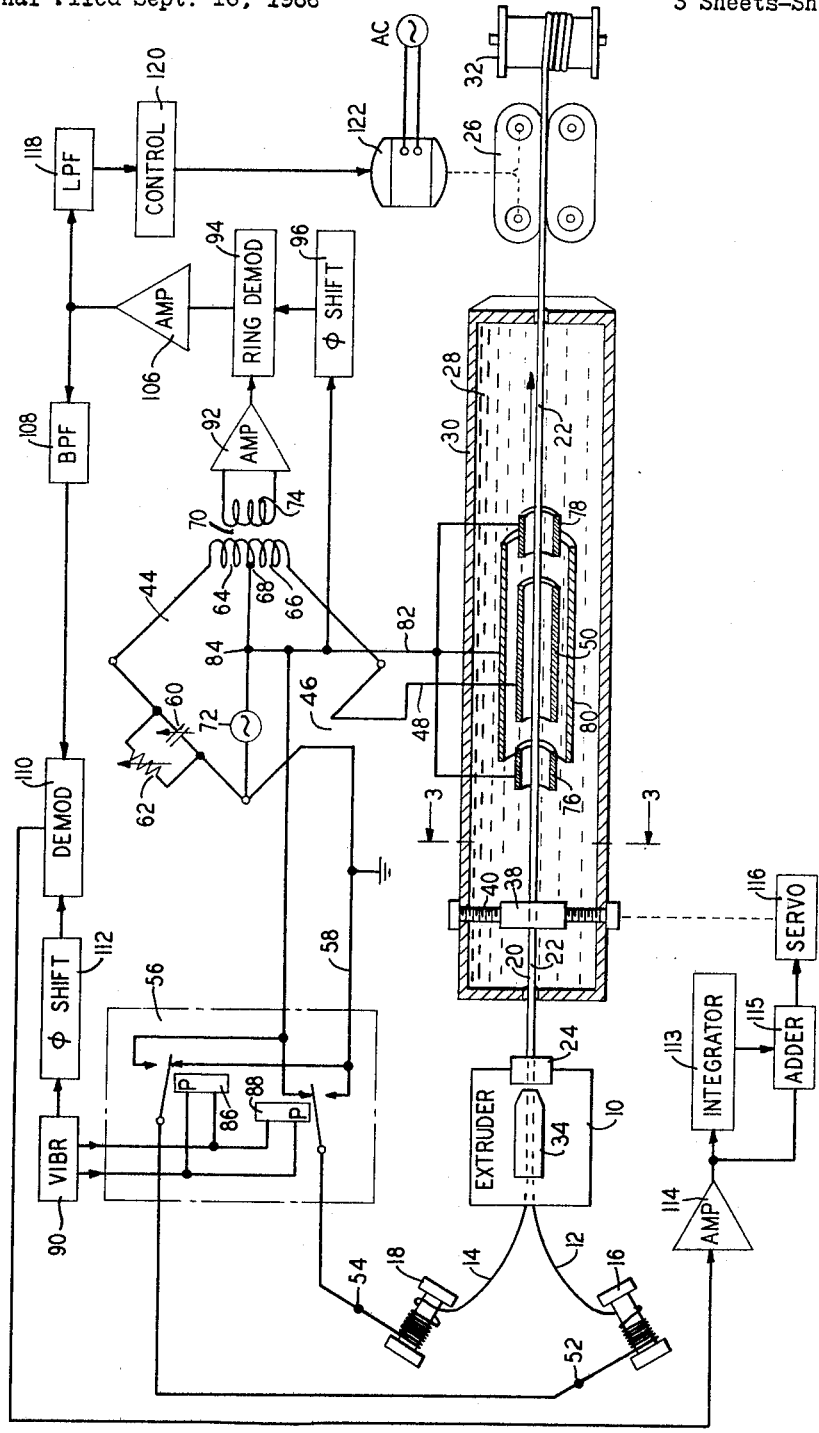
FIG. 1 is a block diagram illustrating schematically an apparatus for manufacturing dual pairs according to an embodiment of the invention.
Figure 2:
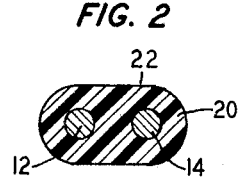
FIG. 2 is a section illustrating a dual pair as manufactured by the apparatus of FIG. 1.

In FIG. 1 an extruder 10 embeds bare wires 12 and 14, which are drawn axially over the ends of respective reels 16 and 18, in a hot plastic insulating jacket 20 to form the plastic extruded pair 22 illustrated sectionally in FIG. 2. The pair 22, with the jacket still hot and in a plastic state, emerges from the extruder through an extruding die 24. A capstan 26 draws the pair through the extruder and then through the cooling water 28 of a cooling trough 30 and feeds the finished pair onto a take-up roller 32.

The extruder 10 aligns the wires 12 and 14 within the jacket 20 by passing them through respective critically-spaced parallel passages in an interiorly-insulated core tube 34 that terminates near the die 24. This guides the wires 12 and 14 so that they are parallel to each other as they pass through the extruding die 24. The core tube 24 thus determines the distance between the wires.

Figure 3:
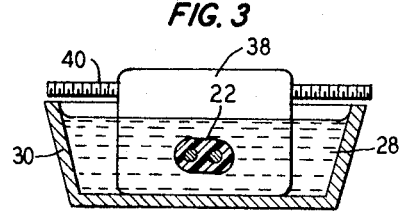
FIG. 3 is a section 3—3 of FIG. 1.

As the pair 22 travels through the trough 30, a guide block 38 slidingly embraces it with a suitable opening located under the water line, as shown in FIG. 3. The block 38 is laterally movable by a worm 40. This movement locates the position of the wires 12 and 14 relative to the opening in the die 24 and the core tube 34 to thereby establish the radial positions of the wires within the jacket 20. Devices using guide blocks, such as 38, are disclosed in E. O. Bauer-P. E. Fox-W. F. MacPherson, Case 2-1-1, Ser. No. 513,705, filed Dec 14, 1965.

In order to obtain uniform attenuation for signals in the conductors the capacitance between the surface of the pair 22 and each of the conductors is measured. In FIG. 1 this is done by a capacitance bridge 44 whose one arm 46 is composed of the capacitance represented between first one wire 12 and then the other wire 14 and a column of water in trough 30 contacting the surface of the pair 22. Contact at this arm 46 is made to the surface of the pair 22 through a line 48, through an elongated cylindrical measuring electrode 50 coaxially surrounding the pair 22 in the water 28, and through the water 28. The water 28 thus constitutes one plate of the capacitor being measured. For this purpose it must have sufficient impurities to make it electroconductive. The other plate of the capacitor being measured, constituted by one and then the other wires 12 and 14, connects to the arm 46 of the bridge 44 by means of contacts 52 and 54 on the ends of wires 12 and 14, and through a switching network 56 and a grounded lead 58.

Forming the second arm of the capacitance bridge 44 is a variable calibrated standard capacitor 60 shunted by a variable phase-adjusting resistor 62. The two remaining arms of the bridge are the respective equal halves 64 and 66 of a transformer primary 68 on a transformer 70. An alternating-current generator 72 such as a 20-kilocycle generator establishes an energy source. The capacitor 60 is adjusted to a desired capacitance value. The resistor 62 is adjusted to compensate for resistances in the arm 46. When the impedances, and hence the capacitances in the arm 46 and the arm having the reference capacitor 60 are equal, currents passing through the halves 64 and 66 of the transformer primary 68 are equal and opposed to each other. Since the transformer primary winding halves 64 and 66 are also equal such equal and opposing currents establish a zero voltage at the secondary winding 74 of the transformer 70.

In order that the capacitance measured in the arm 46 always represents a uniform capacitance over a constant distance of the pair 22, the currents measuring the capacitance of arm 46 and passing through the water 28 are confined to a uniform axial length by two axially-spaced, and one surrounding, sleevelike isolating electrodes 76, 78 and 80, respectively. A lead 82 connects these isolating electrodes to a neutral point 84 in the bridge 44.

In FIG. 1, the switching circuit 56 connects one and then the other wires 12 and 14 into the arm 46 by means of two single-pole, double-throw relays 86 and 88 of the mercury-wetted contact high-speed type. Actuating the relays is a 40-cycle square wave source 90, such as a vibrator. Each of the wires 12 and 14 connects to a respective armature in the relays 86 and 88. Operation of the relays connects one wire to the grounded lead 58 and the other wire to the neutral lead 82. Source 90 operates the relays in unison. As shown the wire 12 is connected into the arm 46 and the wire 14 to the neutral lead 82. When the source flips over, the armatures flip up and down respectively and the wire 14 connects into the arm 46.

Figure 4:
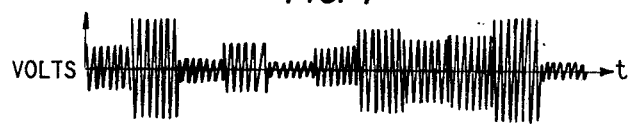
FIG. 4 is a voltage-time diagram illustrating voltage excursions occurring during operation of the apparatus of FIG. 1.

If each of the wires 12 and 14 in the pair 22 passing through the electrode 50 exhibit capacitances to the water column or the surface of the plastic equal to the capacitor 60, then the output of the secondary winding 74 on the transformer 70 is constantly zero. When one wire and then the other wire exhibit different and varying capacitances to the surface, so that they are unbalanced, the output at the transformer 70 consists of a 20-kilocycle carrier, step modulated as shown in FIG. 4. If at any time, the capacitance is greater than the standard capacitor 60, the current through the half 66 exceeds the current through the half 64. On the other hand, the lower capacitance in the arm 46 produces greater current in the half 64. Since instantaneous currents in the halves 64 and 66 flow in opposite directions, the phase at the secondary 64 for the condition of the capacitances in arm 46 exceeding the capacitor 60 will be 180 degrees from that of the capacitance in arm 46 being less than the capacitor 60. The capacitances of the pair thus amplitude- and phase-modulate the output of bridge 44.

To distinguish the current reversal or phase shift due to excessive and low capacitance, an amplifier 92 tuned to 20 kilocycles passes the output of the secondary 74 into a ring demodulator 94 which compares the phase at the secondary 74 with a standard 20-kilocyle voltage obtained at the point 84 from the oscillator 72 and shifted to conform with one of the two opposite phases by a phase shifter 96. The output of the ring demodulator for various conditions appears in FIG. 5. At the first two steps 98 and 100, both wires 12 and 14 have capacitances to the plastic surface that exceed the standard capacitor 60 but by different amounts. At the steps 102 and 104, one capacitance between wire and surface exceeds the capacitor 60 and the other is lower. An amplifier 106 feeds the output of the ring demodulator to a narrow 40-cycle bandpass filter 108. The latter has the purpose of eliminating noise from the signal. In particular, it suppresses 60-cycle, 120-cycle and 20-kilocycle components. The filter also eliminates the direct-current excursions of the average value, shown in broken lines in FIG. 5, so as to achieve the curve shown in FIG. 6. A demodulator 110 then compares the signal from the bandpass filter 108 with a signal from the multivibrator 90 as phase shifted by a phase shifter 112.

Figure 6:
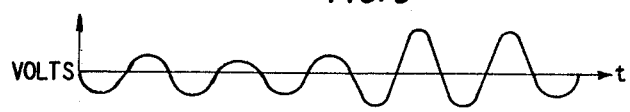
FIG. 6 is a voltage diagram illustrating the voltage output of a bandpass fiter in FIG. 1.

By comparing the polarity of the cycle at the input to the demodulator 110 with the polarity of each cycle emerging from the multivibrator 90, the demodulator produces an output corresponding to the peak-to-peak amplitude of the signal in FIG. 6 and having a polarity determined by which of the wires 12 or 14 has a higher capacitance relative to the other surface of the pair 22. An integrator 113 receives the signal through an amplifier 114. It time-integrates the signal from the demodulator 110. An adder 115 combines predetermined proportions of the unintegrated signal and integrated signal before passing it to a servo system 116. The servo system 116 responding to the output of the adder 115 turns the worm 40 in one or the other direction. This moves the guide block 38 laterally to change the position of the wires in the die 24 and thereby change the relative capacitances, for capacitive balance of each wire 12 and 14 to its surface. The slight change in spacing between wires 12 and 14 due to movement of guide block 38 is too small to affect the pairs' performance. The integrator furnishes information regarding the total accumulated imbalance at any time. While this is often useful to assure high accuracy, in one embodiment of the invention the proportions in the adder eliminate the integrated signal. The integrator 113 and adder 115 are then superfluous.

In this manner, the apparatus of FIG. 1 produces a pair whose capacitive balance is controlled. However, it is possible that the total capacitance of each wire relative to "ground" or to the surface vary due to excessive or insufficient plastic in the jacket 20. It is possible to measure the total capacitance and adjust for its variation by measuring the capacitances from the wires 12 and 14 to the surface simultaneously. However, such simultaneous measurement, by placing the wires 12 and 14 at equal potentials, fails to take account of the condition of the plastic in the jacket 20 between the wires 12 and 14. In FIG. 1, uniformity is accomplished by measuring the "wire 12 to surface" and "wire 14 to surface" capacitances separately, while maintaining the unmeasured wire at or near a neutral potential so that the entire plastic jacket 20 affects the measurements. The differences in capacitances between the two measurements are then ignored and only the average value of the departure from the standard capacitor 60 used to control the operation of the extruder.

Figure 7:
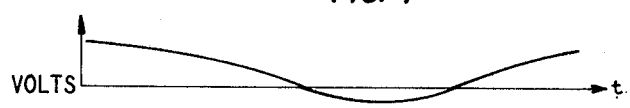
FIG. 7 is a voltage-time diagram illustrating the signal for controlling the extruder output in the apparatus of FIG. 1.

In FIG. 1 this is done by passing the square wave output of the amplifier 106 through a low pass filter 118. This removes the 40-cycle and higher frequency components shown in FIG. 5 while leaving the direct-current excursion shown in FIG. 7. A control device 120 varies the speed of a motor 122 that operates the capstan 26. By drawing the pair 22 from the extruder 10 at a slower and faster speed, the capstan varies the consistency and thickness of the jacket 20. A higher speed produces a lower wire-to-surface capacitance than the lower speed. The wire-to-surface capacitance may also be called the "wire-to-ground" capacitance. The term "ground" then refers to an equivalent potential in the cable, not a potential in FIG. 1.

Figure 5:
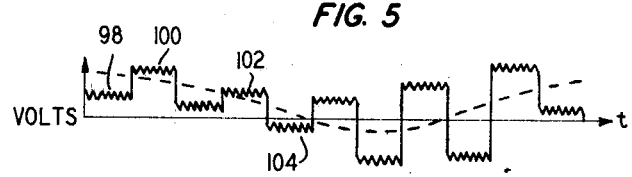
FIG. 5 is also a voltage-time diagram illustrating the demodulated output of a capacitance bridge in FIG. 1.

In summary, then, the extruder 10 produces plastic extruded pairs 22 whose capacitances from each wire to ground depend upon the speed of the capstan 26 which draws the pair. The relative capacitance of each wire to surface depends upon the position of the guide 38 relative to the die 24 and the core tube 34. As the completed pair 22 passes through the measuring electrode 50, the guard electrodes 76, 78 and 80 confine electrical measuring currents from the measuring electrodes to the volume of the water inside the measuring electrode. In effect, the water itself contacting the surface of the pair within the volume of the measuring electrode becomes a capacitor plate intimately contacting the outer surface of the jacket 20. The second plate of the capacitor is alternately one and then the other of the wire 12 as connected through the switching circuit 56. This alternate capacitor constitutes the arm 46 in bridge 44. At any time, if the impedance of the arm 46 due to low capacitance exceeds the impedance of the capacitor 60, a signal whose amplitude corresponds to the degree of departure from the standard exists at the secondary 74. The signal there will have a phase or instantaneous polarity indicative of the fact that the impedance was high. When the impedance is low due to high capacitance, the phase is reversed but the amplitude still corresponds to the magnitude of impedance departure. The ring demodulator compares the phases of the output signal with the 20-kilocycle generator 72 to produce a signal whose amplitude corresponds to the impedance departure and whose polarity corresponds to the direction of departure. This is shown in FIG. 5. The bandpass filter 108 eliminates any noise pickup of 60 or 120 cycles per second and any "hash" of higher order frequencies. It also eliminates the low frequency excursion shown on the dotted lines of FIG. 5. The 40-cycle demodulator 110 then furnishes the signal whose polarity corresponds to which of the two wires has been measuring the lower capacitance and whose amplitude corresponds to the difference in impedance between the two alternate measurements. This difference is then combined with the accumulated total difference. The servo system 116 by operating the guide 38 corrects for capacitance unbalance on the basis of the combined differences. A low pass filter 118 recovers the low frequency excursion in FIG. 5 and thereby controls the speed of the capstan 26 for changing the total capacitance of the wires relative to the water 28.

Figure 8:
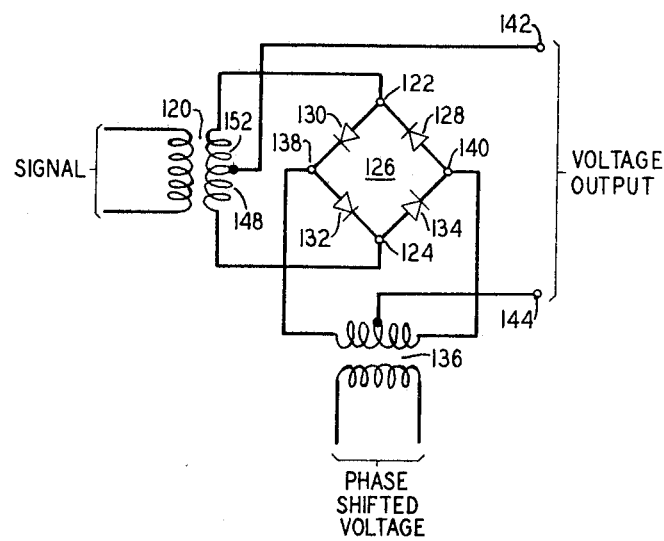
FIG. 8 is a circuit diagram of a ring demodulator in FIG. 1.

The demodulator 110 may be a ring demodulator such as demodulator 94. A sample of a ring demodulator 94 or 110 appears in FIG. 8. Here a transformer 120 applies the signal voltage to the opposite corners 122 and 124 of a rectifier bridge 126 whose diodes 128, 130, 132 and 134 are connected in a ring. A transformer 136 applies the reference voltage. The latter is of like frequency and phase shifted to be either in phase or 180 degrees out of phase with the signal voltage. It appears on the remaining opposite corners 138 and 140 of the bridge. An output voltage appears at terminals 142 and 144 connected to the centertap of the secondaries in transformers 120 and 136.

In operation the reference voltage from transformer 136 is always at least twice the signal voltage. When the alternating signals from the transformers 136 and 120 are such as to establish positive potentials at corners 122 and 138, the diodes 132 and 134 conduct. The diode 134 conducts because the corner 140, connected to the transformer 136 is more negative than the corner 124. Thus the windings of transformer 136 are effectively shorted and the winding half 148 is connected across the terminals 142 and 144. A positive potential thus appears at terminal 142. If negative potentials appear at corners 122 and 138, that is positive potentials appear at corners 140 and 124, the terminal 142 remains positive. In this case, the diodes 128 and 130 conduct and connect the winding half 152 across the output terminals. Thus as long as the phase relationship remains constant the output polarity remains the same. The output voltage corresponds to the signal voltage.

Only when the phase relationship of one transformer to the other reverses does the terminal polarity reverse. Thus when corners 122 and 140 are both positive, diodes 130 and 128 conduct. This shorts the transformer 136 again and effectively places the winding half 152 at the terminals 142 and 144. The terminal 144 then exhibits a positive voltage whose magnitude corresponds to the signal voltage. When corners 122 and 140 are negative, that is 138 and 124 are positive, diodes 132 and 134 conduct, and winding half 148 applies the voltage to the output terminals. The demodulator 94 or 110 effectively multiples the values of the input voltages, where the reference potential is considered to be plus or minus 1.

At low frequencies such as 40 c.p.s., it is simpler to use a vibrator device for the demodulator 110. This is done in a preferred embodiment of the invention. Such a vibrator device appears in FIG. 9. Here a transformer 160 having a center-tapped secondary winding and receiving signals from the filter 108 energizes the amplifier 114 with one or the other winding depending on the position of an armature 162 in a relay 164. The latter, for example, lifts up to contact one winding half when the signal into a relay coil 166 is positive and drops to contact the other winding half when the signal is negative. The two incoming voltages are of equal frequency and in phase or 180 degrees out of phase. When the armature 162 lifts and contacts a positive voltage because the incoming signals are in phase the output is positive. When it drops on the next cycle with a negative voltage in coil 166, the voltage in transformer 160 reverses and the armature still contacts a positive voltage. Thus the output voltage to amplifier 114 remains the same. When the incoming signals are 180 degrees out of phase the signal to amplifier 114 is always negative.

Figure 9:
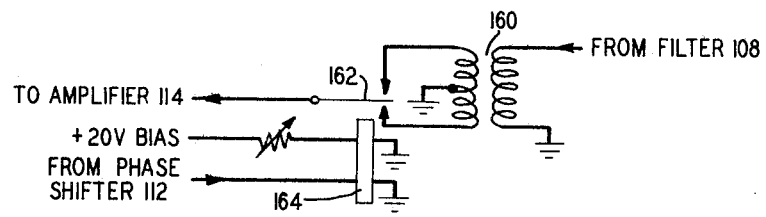
FIG. 9 is a circuit diagram illustrating details of a circuit usable for one of the demodulators in FIG. 1.

A biasing coil 168 connected to a suitable biasing voltage adjusts operation of the demodulator or polarity coincidence detector in FIG. 9.

By virtue of the invention, the apparatus is capable of correcting not only for a capacitive unbalance in the wires but at the same time the apparatus is able to establish a uniform total capacitance throughout the wire. This total capacitance considers the condition of the plastic not only near the surface of the pair but also between the wires of the pair.

While an embodiment of the invention has been described in detail, it will be obvious to those skilled in the art that the invention may be embodied otherwise without departing from its spirit and scope.

What is claimed is:

1. A manufacturing apparatus for wire pairs comprising insulation applicator means for continuously applying insulation to two moving wires and critically spacing said wires, bath means for submerging said insulated wires in an electroconductive liquid, bridge means having a standard capacitor and extending into said bath means for establishing an electrolytically isolated column of liquid about said insulated wires and for alternately comparing the capacitance of said capacitor with the respective capacitances between first one and then the other of said wires and the column of liquid, filter means for extracting from the resulting alternate comparisons one of two frequency components the higher of which equals the frequency of the alternate comparisons, and servo control means connected to said filter means for affecting operation of said insulation applicator means on the basis of the amplitude and phase of the extracted one of said frequency components.

2. Apparatus as in claim 1 wherein said filter means extract the lower of said components and said servo control means affect operation on the basis of the amplitude and phase of said lower frequency component.

3. Apparatus as in claim 1 wherein said filter means extracts the higher of said components and said servo control means affect operation on the basis of the amplitude and phase of said higher frequency component.

4. Apparatus as in claim 1 wherein said filter means extract both components separately and said servo control means separately affect the operation of the basis of the respective amplitudes and phases of both of said components.

5. Apparatus as in claim 3 wherein said filter means include a bandpass filter tuned to the switching frequency and a phase-and-amplitude detector.

6. Apparatus as in claim 2 wherein said insulation applicator means includes a capstan for drawing the wires after they are insulated, and wherein said servo control means vary the speed of said capstan means, whereby the amount of insulation applied to said wires is controlled.

7. Apparatus as in claim 1 wherein bandpass filter means derive the higher frequency component of the resulting alternate comparisons equal to the frequency at which the comparisons occur, and wherein feedback means connected to said insulation applicator means vary the relative amounts of insulation applied to respective ones of said wires.

8. Apparatus as in claim 7 wherein said feedback means include phase comparator means connected to said bandpass filter means for establishing the direction of the departures of the capacitances from the standard capacitor with which they are compared.

9. Apparatus as in claim 7 wherein said feedback means include integrator means for establishing the total departure of compared capacitances from the standard capacitor and thereby affecting the variation in the relative amounts of insulation applied.

10. Apparatus as in claim 7 wherein adder means in said feedback means apply a portion of information from said integrator means and a portion of unintegrated information for varying the relative amounts of insulation applied to the wires.

References Cited

UNITED STATES PATENTS

| 2,820,987 | 1/1958 | Bunch. |
| 3,122,784 | 3/1964 | Jolliffe. |
| 3,288,895 | 11/1966 | Windeler. |
| 3,307,215 | 3/1967 | Gerhard et al. |
| 3,311,947 | 4/1967 | Fenley. |
| 3,433,858 | 3/1969 | Bauer et al. |

WILLIAM J. STEPHENSON, Primary Examiner